(12) United States Patent
Cui et al.

(10) Patent No.: US 11,275,838 B2
(45) Date of Patent: *Mar. 15, 2022

(54) CODE PACKAGE PROCESSING

(71) Applicant: International Business Machines Corporation, Armonk, NY (US)

(72) Inventors: Peng Cui, Beijing (CN); Dong Xiao Hui, Beijing (CN); Tan Jiang, Beijing (CN); Da Hu Kuang, Beijing (CN); Lan Ling, Beijing (CN); Xu Peng, Shenyang (CN); Liang Wang, Beijing (CN); Chun Xiao Zhang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/507,667

(22) Filed: Jul. 10, 2019

(65) Prior Publication Data
US 2019/0332779 A1    Oct. 31, 2019

Related U.S. Application Data

(63) Continuation of application No. 15/298,770, filed on Oct. 20, 2016, now Pat. No. 10,402,569.

(51) Int. Cl.
*G06F 21/57* (2013.01)
*G06F 8/65* (2018.01)

(52) U.S. Cl.
CPC .............. *G06F 21/577* (2013.01); *G06F 8/65* (2013.01); *G06F 2221/033* (2013.01)

(58) Field of Classification Search
CPC ...... G06F 21/10; G06F 21/57; G06F 21/6209; H04L 29/06; H04L 29/08
See application file for complete search history.

(56) References Cited

U.S. PATENT DOCUMENTS

| 8,464,335 B1 | 6/2013 | Sinha et al. |
| 2012/0222110 A1 | 8/2012 | Huang et al. |

(Continued)

OTHER PUBLICATIONS

Marcus, Twistlock Includes Image Vulnerability Analysis for Docker Containers, Wednesday, Jul. 22, 2015, Retrieved from Internet: URL: http://cloudcomputingintelligence.com/news/item/2294-twistlock-includes-image-vulnerability-analysis-for-docker-containers, 5 pages.

(Continued)

*Primary Examiner* — Dao Q Ho
(74) *Attorney, Agent, or Firm* — Schmeiser, Olsen & Watts, LLP; William Hartwell

(57) ABSTRACT

A method and system. A dataset is generated according to a code package. The code package includes an image file associated with a container for a tenant in a cloud environment. The dataset includes general information related to security aspects of the image file. The image file includes two or more image layers. A security indicator of the image file is extracted according to the dataset. A security level of the image file is determined by comparing the extracted security indicator of the image file with a security indicator of an authenticated image file. A vulnerability in the image file is identified based on the determined security level. In response to the vulnerability having been identified, the image file is updated with a patch that fixes the identified vulnerability. The patch includes a new image layer added to the two or more image layers in the updated image file.

17 Claims, 6 Drawing Sheets

(56) References Cited

U.S. PATENT DOCUMENTS

| | | | |
|---|---|---|---|
| 2014/0137258 A1* | 5/2014 | Chakra | H04L 63/1433 726/25 |
| 2014/0365441 A1* | 12/2014 | Palagummi | G06F 11/1469 707/647 |
| 2017/0180346 A1 | 6/2017 | Suarez et al. | |
| 2018/0114025 A1 | 4/2018 | Cui et al. | |

OTHER PUBLICATIONS

Chris Swan, Security Vulnerabilities in Docker Hub Images, May 29, 2015, Retrieved from Internet: URL: http://www.infoq.com/news/2015/05/Docker-Image-Vulnerabilities, 14 pages.

George Leopold, Vendors Focus On Docker Security, Jan. 15, 2015, Retrieved from Internet: URL: http://www.enterprisetech.com/2015/01/15/vendors-focus-docker-security/, 3 pages.

Thanh Bui et al., Analysis of Docker Security, Source: (Submitted on Jan. 13, 2015), Retrieved from Internet: URL: http://arxiv.org/abs/1501.02967, 2 pages.

Alex Welch, How To Secure Your Private Docker Registry, Source: Jan. 2, 2015 by Alex Welch, Retrieved from Internet: URL: https://labs.ctl.io/tutorials/how-to-secure-your-private-docker-registry/, 6 pages.

Office Action (dated Jun. 29, 2018) for U.S. Appl. No. 15/298,770, filed Oct. 20, 2016.

Amendment (dated Oct. 1, 2018) for U.S. Appl. No. 15/298,770, filed Oct. 20, 2016.

Final Office Action (dated Nov. 9, 2018) for U.S. Appl. No. 15/298,770, filed Oct. 20, 2016.

Final amendment (dated Jan. 9, 2019) for U.S. Appl. No. 15/298,770, filed Oct. 20, 2016.

Advisory action (dated Jan. 28, 2019) for U.S. Appl. No. 15/298,770, filed Oct. 20, 2016.

RCE (Feb. 8, 2019) for U.S. Appl. No. 15/298,770, filed Oct. 20, 2016.

Notice of allowance (dated Apr. 11, 2019) for U.S. Appl. No. 15/298,770, filed Oct. 20, 2016.

312 amendment (dated May 15, 2019) for U.S. Appl. No. 15/298,770, filed Oct. 20, 2016.

U.S. Appl. No. 16/508,365, filed Jul. 11, 2019.

Friedman, Jack P.; List of IBM Patents or Patent Applications Treated as Related; Jun. 22, 2021; 1 page.

Well, Peter et al.; "The NIST Definition of Cloud Computing;" National Institute of Standards and Technology; Special Publication 800-145; Sep. 2011; 7 pages.

Casey Bisson, The seven characteristics of container-native infrastructure, Mar. 11, 2015, https://www.joyent.com/blog/the-seven-charactenstics-of-container-native-infrastructur, 2 pages.

Building private Docker registry with basic authentication, deeeet, Oct. 3, 2014, https://medium.com/@deeeet/building-private-docker-registry-with-basic-authentication-with-self-signed-certificate-using-it-e6329085e612, 4 pages.

Nik Van Der Ploeg, Published on Oct. 15, 2014, How To Set Up a Private Docker Registry on Ubuntu 14.04, https://www.digitalocean.com/community/tutorials/how-to-set-up-a-private-docker-registry-on-ubuntu-14-04, 42 pages.

Casey Bisson, Joyent's next generation, Docker-native container service preview, Mar. 6, 2015, https://www.joyent.com/blog/container-service-preview, 6 pages.

Casey Bisson, Docker bake-off: AWS vs Joyent, Mar. 13, 2015, https://www.joyent.com/blog/docker-bake-off-aws-vs-joyent, 13 pages.

\* cited by examiner

CODE PACKAGE PROCESSING

This application is a continuation application claiming priority to Ser. No. 15/298,770, filed Oct. 20, 2016, now U.S. Pat. No. 10,402,569 issued Sep. 3, 2019.

TECHNICAL FIELD

The present invention relates to processing of a code package that contains an image file.

BACKGROUND

With developments of software programming and cloud technologies, the way of developing a new application changes. In the container technology, common basic functions are now packed in respective dependent packages called images, and a developer may develop an application by assembling various images provided by same or different providers.

In order to increase the software reusability, entities such as software companies and/or organizations or even an individual may pack their code in image files and submit the image files to networks for commercial or free use. With the booming of containers, a great number of servers such as datacenters for hosting these image files appear in the networks. As the image files come from various types of providers, how to identify and fix vulnerabilities in the image files becomes an emerging focus.

SUMMARY

The present invention provides a method, and associated computing system and computer program product. One or more processors of a computing system generate a dataset according to a code package, the code package comprising an image file associated with a container for a tenant in a cloud environment, and the dataset comprising general information related to security aspects of the image file. The one or more processors determine a security level of the image file according to the generated dataset. The one or more processors identify a vulnerability corresponding to the code package based on the security level, in response to the vulnerability having been identified, the one or more processors update the code package with a patch associated with the identified vulnerability.

BRIEF DESCRIPTION OF THE DRAWINGS

Throughout the drawings, same or similar reference numerals represent the same or similar elements.

DETAILED DESCRIPTION

Figure 1:
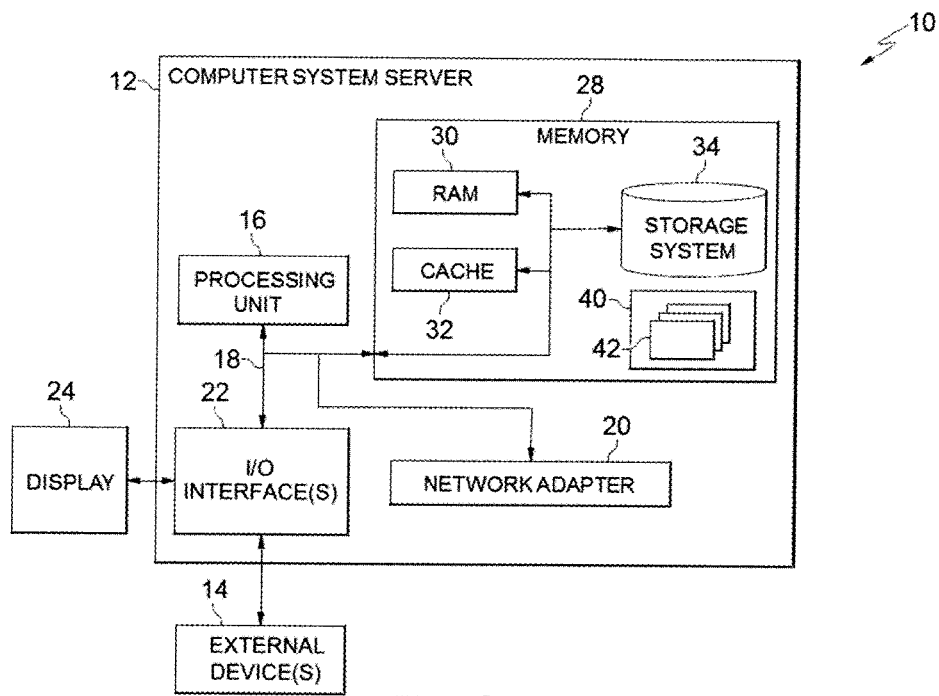
FIG. 1 illustrates a cloud computing node, in accordance with embodiments of the present invention.

Some embodiments will be described in detail with reference to the accompanying drawings, in which the embodiments of the present disclosure have been illustrated. However, the present invention can be implemented in various manners, and thus should not be construed to be limited to the embodiments disclosed herein. On the contrary, those embodiments are provided for the thorough and complete understanding of the present invention, and completely, conveying the scope of the present invention to those skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environments service oriented with a focus on statelessness, low coupling, modularity, and semantic interoperability. At the heart of cloud computing is an infrastructure comprising a network of interconnected nodes.

FIG. 1 illustrates a cloud computing node 10, in accordance with embodiments of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown; a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAM systems, tape drives, and data archival storage systems, etc.

Figure 2:
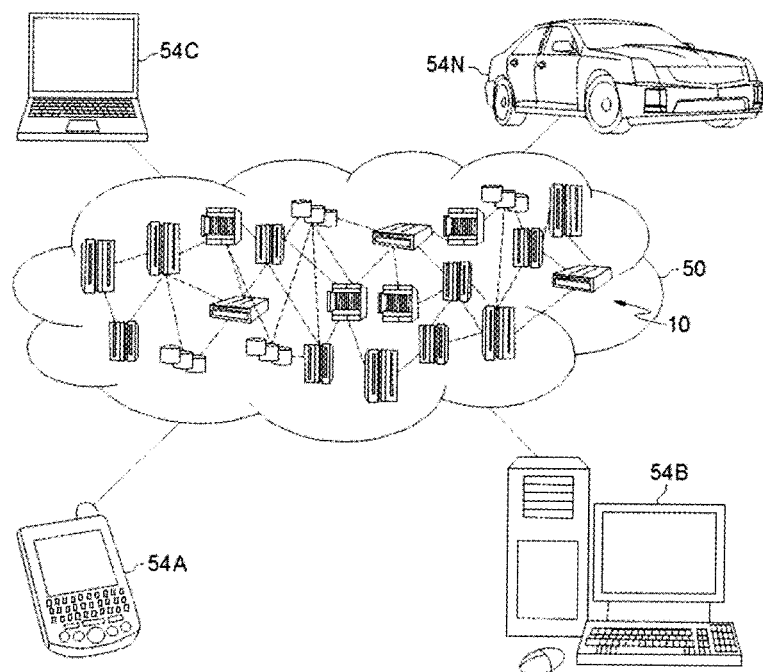
FIG. 2 illustrates a cloud computing environment, in accordance with embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
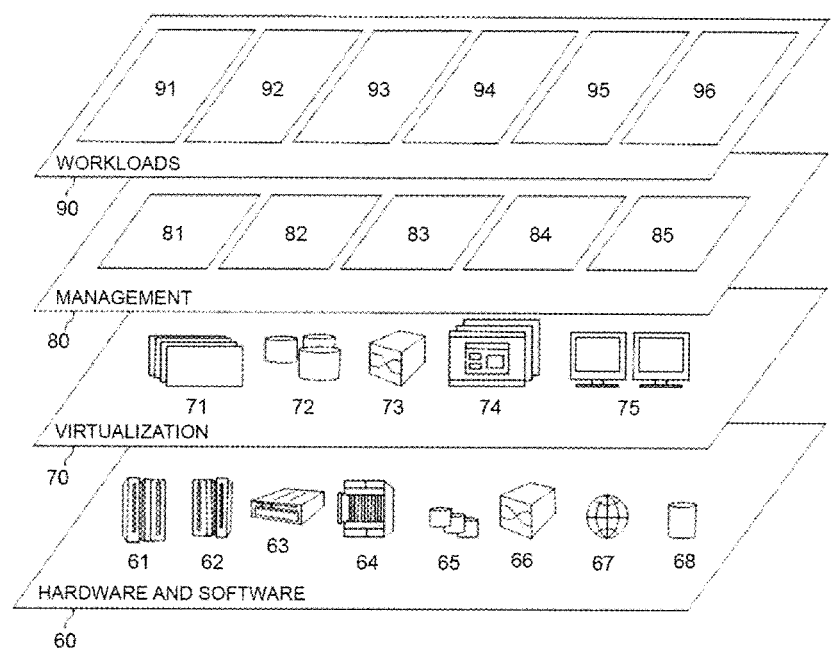
FIG. 3 illustrates a set of functional abstraction model layers provided by a cloud computing environment, in accordance with embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code package management 96.

Figure 4:
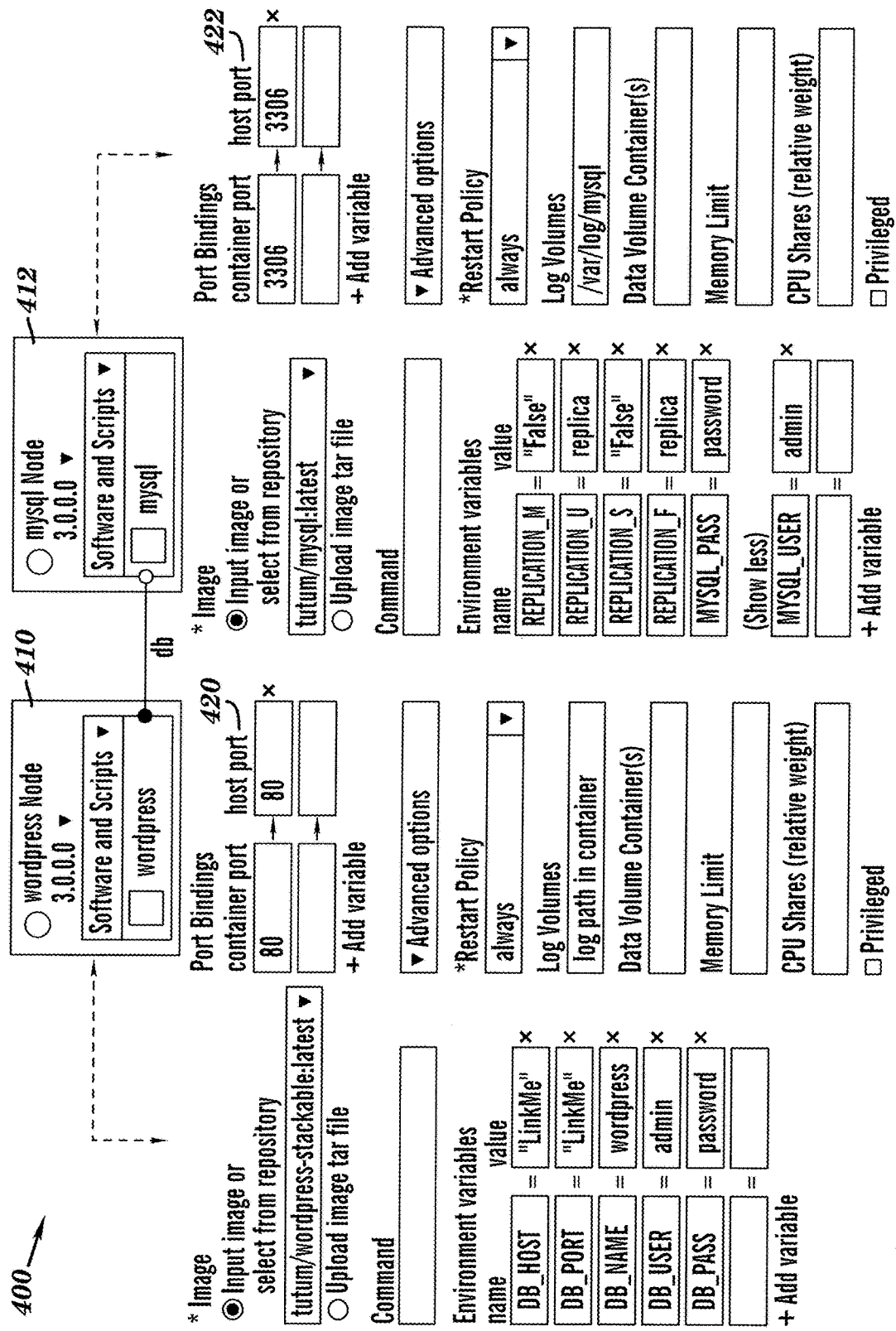
FIG. 4 schematically illustrates a block of a general principle of image and container technology, in accordance with embodiments of the present invention.

FIG. 4 schematically illustrates a block 400 of a general principle of image and container technology; in accordance with embodiments of the present invention. Various image files with different functions may be provided by the software companies, organizations and/or individuals. For example, WordPress is a free and open-source content management system (CMS) based on PHP and MySQL and it provides bldg web hosting services and becomes a popular base for developing a social network application. WordPress allows developers to extend the features and functionalities of a website or blog, and offers customized functions and features enabling users to tailor their sites according to the specific needs. For another example, MySQL is an open-source relational database management system (RDBMS) and is a popular database management tool for use in web applications.

A developer who is programming a social network application may adopt WordPress and MySQL to deal with the basic functions about the blog web hosting services and database services. As these image files are provided by third parties, and the developers may possibly have limited knowledge about the technical fields of blogging and database, it is difficult for the developer to test whether these image files are safe enough for use. As depicted in FIG. 4, the developer may launch WordPress 410 and MySQL 412 by setting attributes in the configuration tables 420 and 422. The developer may fill in the blanks with appropriate values according to the specific context of the social network application.

Although the technologies of image and container may offer more flexibility to software development, they also introduce potential risks into the further development procedure. Like other types of code packages, the image file released in the image servers may have vulnerabilities due to insufficient test or undetected bugs in the coding. These vulnerabilities allow attackers to reduce the system information security, thereby there may be a threat to security aspects of the software development. Accordingly, there is a need to identify and fix the vulnerabilities in the image files.

Some technical solutions are provided for identifying and fixing the vulnerabilities in the image files. In one solution, the image server may specify strict security rules for the image providers who are applying for releasing an image file, and require the image providers to test various aspects of the image files before releasing the image. In another solution, technical staffs of the image server test and fix each image file before the release of the image. However, both solutions cost considerable time and manpower.

In view of the above drawbacks, the present invention proposes a computer-implemented method. According to the method, a dataset is generated according to a code package, wherein the code package comprises an image file associated with a container for a tenant in a cloud environment, wherein the dataset comprises general information related to security aspects of the image file, and wherein a dataset is defined as a set of data. Then, a security level of the image file is determined according to the generated dataset. A vulnerability corresponding to the code package is identified based on the security level. Next, in response to the vulnerability having been identified, the code package is updated with a patch associated with the identified vulnerability.

With the above method, the image file may be checked and fixed automatically. The present invention does not limit the position of the computer that implements the claimed method. The method may be implemented by the image server itself; alternatively, the method may be implemented by another computing device other than the image server.

Figure 5:
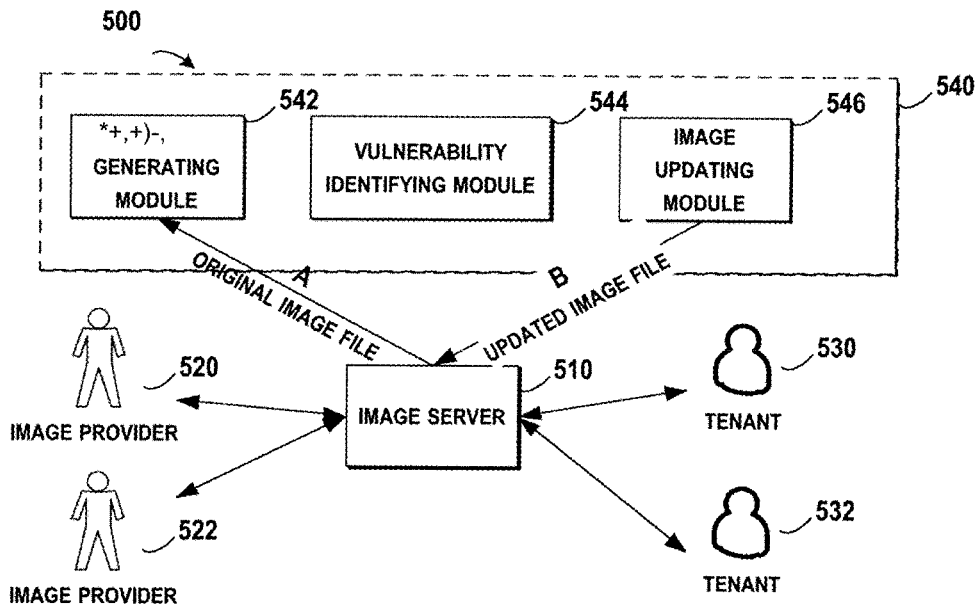
FIG. 5 schematically illustrates a block of a general architecture for managing a code package, in accordance with embodiments of the present invention.

FIG. 5 schematically illustrates a block 500 of a general architecture for managing a code package, in accordance with embodiments of the present invention. In FIG. 5, an image server 510 is provided, where different image providers such as image providers 520 and 522 may access the image server 510 and push their image files (for example, WordPress and MySQL) to the image server 510. Later, software developers (for example, the developers designing a social network application) may connect to the image server 510 to retrieve desired images in the server 510 and assemble the images for different tenants 530 and 532 (for example, the members of the social network application).

Once an image file is pushed into the image server 510 by an image provider, the image file may be processed by a code management apparatus 540 according to the present invention before the image file is released for public access. In FIG. 5, as illustrated by Arrow A, the original image file may be provided to a dataset generating module 542. Then, a dataset may be generated by the dataset generating module 542 from the original image file. Later, this dataset may be utilized for determining a security level of the original image file, and then whether a vulnerability exists in the image file may be identified by a vulnerability identifying module 544. Next, the original image file may be updated by an image updating module 546 based on a patch associated with the vulnerability. As illustrated by Arrow B, the updated image file may be provided to the image server 510.

With the above embodiment, security levels of the image file pushed into the image server 510 by the third parties may be checked and the vulnerabilities may be identified and fixed, thereby the updated image file may be safe for further use. Although an individual apparatus 540 separated from the image server 510 is illustrated in FIG. 5, the apparatus 540 may be located in the image server 510 or reside at a location remote to the image server 510. Additionally or alternatively, the modules 542, 544 and 546 may be located at different locations, as long as data communication is allowed among these modules and the image server 510.

Figure 6:
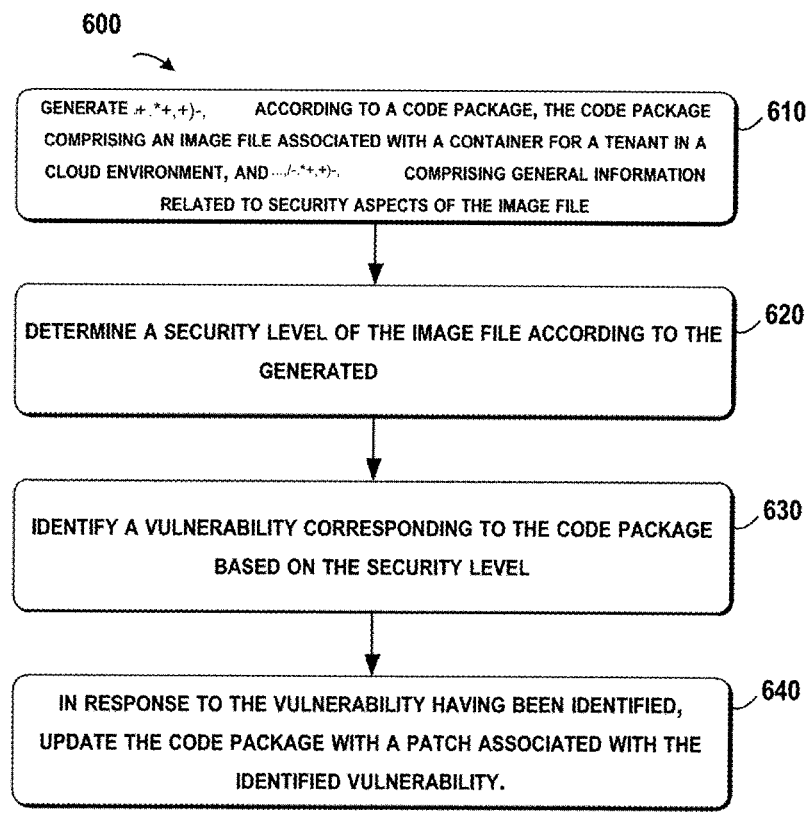
FIG. 6 schematically illustrates a flowchart of a method for managing a code package, in accordance with embodiments of the present invention.

FIG. 6 schematically illustrates a flowchart 600 of a method for managing a code package, in accordance with embodiments of the present invention. In step 610, a dataset s generated according to a code package, where the code package comprises an image file associated with a container for a tenant in a cloud environment, and the dataset comprises general information related to security aspects of the image file. The purpose of this generating step is to obtain the general information related to security aspects of the image file. Those skilled in the art may adopt various methods for generating the dataset.

It is appreciated that the dataset may be represented by various formats according to the specific details of the embodiments. For example, the dataset may be package information of the container when the dataset is generated by running the image file on a Sand Box container, where the Sand Box is a virtual environment for running the image file and those skilled in the art can obtain the definition of Sand Box via Internet. For another example, if layers in the image file are scanned and exported during generating the dataset, then the dataset may be defined as a configuration file associated with the image file. In a further example, a registry API may be called to process the image file; at this point, the dataset may be manifest data of the image file. Descriptions will be provided in further detail below.

In step 620, a security level of the image file is determined according to the generated dataset. Then, in step 630, a vulnerability corresponding to the code package is identified based on the security level. In these steps, a vulnerability corresponding to the code package is identified by determining a security level of the image file according to the generated dataset. Like security levels of ordinary software, the security level of the image file may relate to several aspects. For example, the version of the image file may reflect the security degree to a certain extent, thereby the version of the image file may be considered as the security level. For example, the image file may be tampered with before or after the image file is transmitted to the image server, and thus the integrity of the image file may be another aspect of the security level. Based on the above, a vulnerability in the code package may be determined. In this step 630, "security levels" may be of various types such as "expired version" or "correct version", "security levels" may be "safe" or "unsafe" and the like. If the determined security level of the image is "expired version", a vulnerability corresponding to the determined security level "expired version" is identified. If the determined security level of the image is "unsafe", a vulnerability corresponding to the determined security level "unsafe" is identified.

In step 640, in response to the vulnerability having been identified, the code package is updated with a patch associated with the identified vulnerability. In this step 640, if it is determined that the vulnerability exists in the code package, then a patch associated with the vulnerability may be obtained. Later, the code package may be updated with the obtained patch. In a simple example, if it is known that a certain version of the image file has defects, then the image file of this certain version may be updated to a later version.

In this step 640, an action associated with updating the code package may be implemented. For example, a notification may be generated and provided to the owner of the data center or another party for indicating a need of updating the code package to fix the vulnerability. In another example, the code package may be updated directly, for example, by the owner or by a certain party that has the ability to fix the vulnerability.

The flowchart illustrated in FIG. 6 depicts a method for managing the code package by checking and then fixing the vulnerability of the code package. In this method, the vulnerability may relate to security issues of the code package for a common tenant. In a real development environment, there may be various types of tenants that may use the image file. As different types of tenants may have their own security requirements, how to provide customized image files to these tenants may become an urgent demand.

Besides the step of identifying the vulnerability in the code package as illustrated in step 630 in FIG. 6, the types of the tenants may be determined and the code package may further be updated with another patch associated with a security requirement corresponding to the tenant contract, With this further updating step, the tenants may be provided with more customized services to meet the respective requirements.

In one embodiment of the present invention, a tenant contract associated with a tenant type supported by the code package may be obtained; and the code package may be updated with a further patch associated with a security requirement corresponding to the tenant contract.

The image server may provide image files for different types of tenants. Continuing the example of developing the social network application, if the social network application provides a common tenant with simple functions such as posting articles and pictures, then a simple certificate rule may be enough for the common tenant. If the application also provides advanced functions such as on-line payment to VIP tenant, then the VIP tenant may have more security requirements than the common tenant.

Different tenants may have their own security requirements. For example, OpenSSL is an implementation of SSL/TLS, the file "openssl.conf" defines some important parameters that may be set to different values according to the security requirements in the tenant contract.

Figures 7, 8A, 8B, 8C:
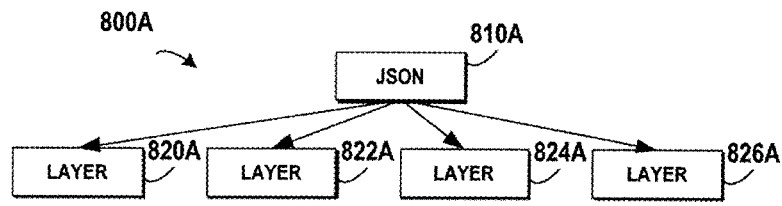
FIG. 7 schematically illustrates an example of a configuration file of an image file, in accordance with embodiments of the present invention.
FIGS. 8A-8C schematically illustrate procedures of exporting an image layer from an image file in accordance with embodiments of the present invention.

FIG. 7 schematically illustrates an example of a configuration file 700 of an image file, in accordance with embodiments of the present invention. As illustrated in FIG. 7, the parameter with the reference number 710 may indicate how long the X509 certificate can be used. For the common tenant, the value of parameter 710 may be set to a longer time period such as 365 days, and for the VIP tenant, the value of parameter 710 may be set to a shorter time period. The parameter with the reference number 720 may indicate the time period to revoke the certificate. The parameter with the reference number 730 may indicate the length of a private key that is used for communication security. For the common tenant, the value of parameter 730 may be set to 1024 bits, while for the VIP tenant, the value of parameter 730 may be set to a greater length such as 2048 bits or another value. Further, the parameter with the reference number 740 may indicate the version of the X509 certificate.

Based on the principle in the above paragraphs, the original image file may go through two phases of security check: the first phase checks the security level of general aspects of the image file, and the second phase checks the image file according to the individual requirements of the tenant and provides the customized updating to the original image file.

In one embodiment of the present invention, a "dry-run" procedure may be performed on the image file for generating the dataset from the code package. First, the image file may be loaded into a Sand Box environment to initiate the container, and then the package information of the container may be obtained by launching the container as the dataset.

In this embodiment, the image file may be run on a Sand box to launch the container. Specifically, the image file may be loaded in an OS with customized kernel to launch the container and run related unit test. For example, a command such as "docker exec $container_id rpm -qa" may be called to collect the installed packages from the image, such that all of the needed system information may be collected as the input for further processing. Based on the system information, the subsequent step of identifying the vulnerability in the code package may be triggered.

In one embodiment of the present invention, an image layer may be exported from the image file, and then a configuration file of the image layer may be obtained as the dataset FIGS. 8A-8C schematically depict procedures of exporting an image layer from an image file, in accordance with embodiments of the present invention.

The image file may be scanned to detect a potential vulnerability inside the file system of the image file. FIG. 8A schematically illustrates an example hierarchical structure 800A of an image file in the Docker registry V2.0 file system. A root 810A may be fetched first, and then layers 820A, 822A, 824A and 826A at the next lower level may be fetched by traversing the hierarchical structure 800A from the root 810A.

Then the content of each of the layers 820A, 822A, 824A and 826A may be inspected in the file system. For example, in order to scan the potential vulnerability in an OpenSSL image, a command "docker save $image_name>/home/<image_name>.tar" may be called to export all of the image layers from the target image. At this point, an example interface as illustrated in FIG. 8B may be displayed. Furthermore, the image layer directory may be stepped into and then the configuration files inside the image layer directory may be checked so as to find the potential vulnerability.

For example, regarding the image file with the configuration file illustrated in FIG. 7, once this image file is scanned in the above manner, an example configuration file 800C as illustrated in FIG. 8C may be returned. By checking the example configuration file 800C, the OpenSSL configuration may be verified to see whether it hit the hole described in the image vulnerability checklist.

In one embodiment of the present invention, a manifest data of the image file may be obtained as the dataset by calling a registry API. In this embodiment, the registry API may be called to get the manifest for the image file. For example, a command "/v2/<image_name>/manifests/<image_tag>" may be called to fetch the manifest, and then the manifest may be checked to find whether a vulnerability exists in the image file.

Figures 9, 10:
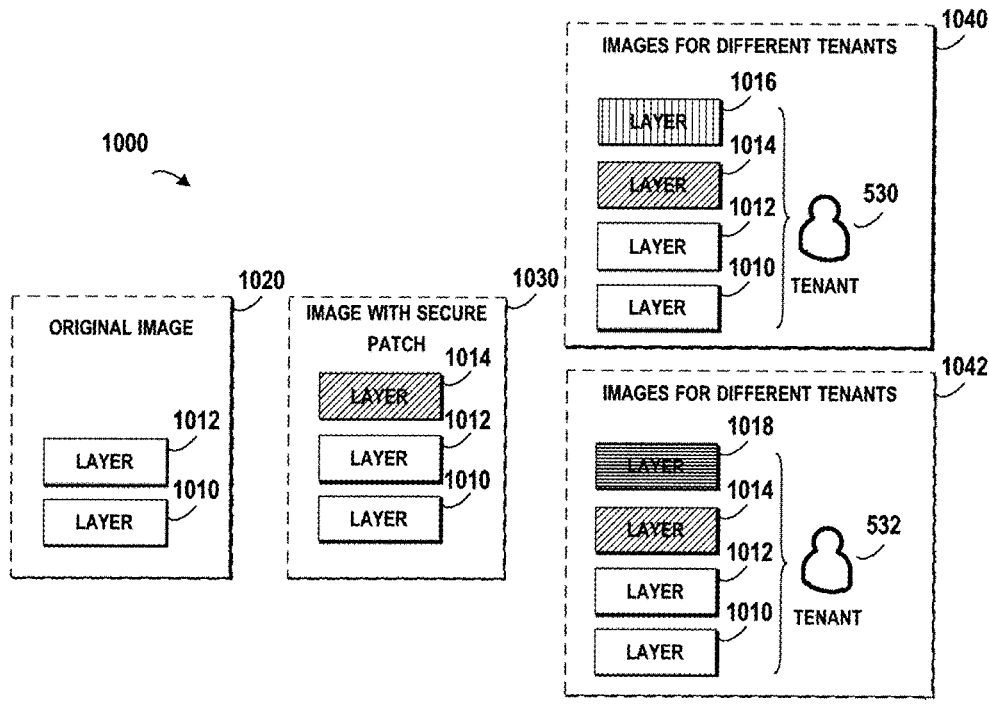
FIG. 9 schematically illustrates an example of manifest data of an image file obtained by, calling a registry Application Program interface (API), in accordance with embodiments of the present invention.
FIG. 10 schematically illustrates examples of data structures of an original image file and image files updated, in accordance with embodiments of the present invention.

FIG. 9 schematically illustrates an example of manifest data of an image file obtained by calling a registry API, in accordance with embodiments of the present invention. As illustrated in FIG. 9, the parameter 910 indicates the length of the private key that is used for communication encryption, and the parameter 920 indicates a time period for the private key. These parameters 910 and 920 may be identified from the manifest and updated according to the type of the tenant.

In one embodiment of the present invention, in order to determine the security level of the image file from the dataset, a security indicator of the image file may be extracted according to the dataset, and then the security indicator of the image file may be compared with a security indicator of an authenticated image file so as to determine the security level of the image file. In this embodiment, the authenticated image file may be an image file having been confirmed to be safe. In other words, this authenticated image file may be considered as a clean version and no vulnerability exists in the authenticated image file. During the comparing, if the security indicator of the image file matches that of the authenticated image file, then it may be determined that the image file is safe and may be pushed into the image server for public access. Otherwise, if a mismatch occurs, then potential vulnerabilities may exist in the image file and the vulnerabilities should be fixed.

Specifically, if the security indicator of the image file matches that of the authenticated image file, the security level of the image file may be determined to be "safe," "correct version" or other flags notifying no vulnerability. If a mismatch occurs, the security level of the image file is determined to be "unsafe," "expired version" or other flags, notifying a vulnerability. For example, the identified vulnerability may indicate the security level "unsafe," "expired version" and the like.

The security level of the image file may be indicated by various aspects, and each of these aspects may be represented by an indicator. For example, the version of the image file may be one indicator, and whether the image file is tampered or not may be another indicator. In one embodiment of the present invention, during extracting the security indicator, at least one of a signature, a version or a root kit of the image file may be extracted according to the dataset for identifying the vulnerability.

Various security indicators may be used for determining whether the image file is safe or not. For example, an officially released image file may be tampered with and inserted with a harmful code segment before the officially released image file is pushed to the image server 510. At this point, the tampered image file may be polluted and not safe for further use. In this example, the security indicator may be a signature (such as a hash string) of the image file for further comparison with the signature of the authenticated image file, Those skilled in the art may adopt various ways to generate a hash string from the image file as the signature, and the detailed information is omitted here.

In another aspect, the version of component in the image file may also reflect the security level to a certain extent. For example, Java 7 has a "zero-day" vulnerability which is fixed by a later patch of Update 11. By checking the version of the Java used in the image, any image that contains Java 7 without Update 11 is considered as insecure. For example, SSLv3 has a vulnerability in its design which allows the plaintext of secure connections to be calculated by a network attacker. Then in updating the image file, SSLv3 should be disabled and TLSv2 may be enabled for secure communication. In still another aspect, the root kit of the image file may be checked to determine the security level of the image file, and those skilled in the art may make use of the root kit in identifying the security level based on the specific context of the image file.

Although the above paragraphs describe ways for identifying a vulnerability based on the signatures, the versions and the like, those skilled in the art may adopt other methods that are utilized in the art or to be developed in the future, as long as these methods can find out the vulnerability in the image file. In one embodiment of the present invention, a checklist recording the potential vulnerabilities may be predefined. The content of the dataset may be checked according to the checklist to verify various aspects of the security level. For example, the above security indicators may be recorded in the checklist.

In one embodiment of the present invention, during updating the code package with the patch, a new image layer for the image file may be created based on the patch. Then, a mapping relationship may be generated between the image file and the new image layer.

FIG. 10 schematically illustrates examples of data structures of an original image file and data structures updated in accordance with embodiments of the present invention. According to FIG. 10, the original image 1020, which is provided by the image provider to the image server, includes two layers: layer 1010 and 1012. Then, the original image 1020 is subjected to the method of the present invention to fix the vulnerability in the original image 1020. The original image 1020 may go through two phases of security check: a common security check and an advanced security check.

First, the original image 1020 goes through the common security check as illustrated in FIG. 6. This phase may find and fix the vulnerability associated with the general aspects such as the version, the integrity and other attributes of the image file. In this phase, if it is found that Java 7 is used in the image file, then a secure patch that updates the Java 7 to a latest version may be obtained and a new layer 1014 including the patch may be attached to the original image 1020 to generate a new image 1030 with the secure patch. Although the secure patch illustrated in FIG. 10 relates to only updating the version of Java, in another embodiment, the secure patch may include one or more other secure patches for updating the versions, for defining the configurations in the image file, and the like.

Then the image 1030 with secure patch may go through a second phase that updates the image file according to the special requirement of a tenant of the image file. In this phase, customization may be provided in the security checking. If the image file is designed for a common tenant, then the image file may keep unchanged because the current image 1030 is safe enough for the daily use for the common tenant. If the image file is designed for a VIP tenant, then the image 1030 may be updated with one or more dedicated patches associated with the requirements from the VIP tenant. As illustrated in FIG. 10, the images 1040 and 1042 may include different layers for different tenants. With regard to a VIP tenant 530, the layer 1018 may include a patch for setting the length of the private key to 2048 bits. For another VIP tenant 532, the layer 1016 may include a patch for setting the validity period of the certificate to 365 days.

The content of the updated images 1030, 1040 and 1042 may be defined in a mapping table as illustrated in Table 1. Although only one layer 1014 is illustrated for fixing the common security issue in Table 1, there may be one or more layers according to the specific situation of the image file.

TABLE 1

Mapping Relationship

| ID | Name of Image File | Layers of Image File |
|---|---|---|
| 1 | Image 1030 | Layers 1010, 1012, 1014 |
| 2 | Image 1040 | Layers 1010, 1012, 1014, 1018 |
| 3 | Image 1042 | Layers 1010, 1012, 1014, 1016 |
| ... | ... | ... |

With the hierarchical structures as illustrated in FIG. 10, different tenants with individual tenant contracts may be provided with dynamic security services. Further, as the updated image file is constructed in the hierarchical structure with updatable layers, increased flexibilities may be achieved in updating and managing the image files. In the example of FIG. 10, only one copy of the basic layers (for example, layers 1010 and 1012 in the original image) may be maintained in the image server, meanwhile, only one copy of the various patches may be stored. In this example, the layers 1010, 1012, 1014, 1016 and 1018 may be held in the image server, thereby it is unnecessary to keep the redundant layers in each version of the image files and storage space may be saved.

In one embodiment of the present invention, in response to a pulling request for the code package from a tenant, the image file may be returned to the tenant, and then the new image layer may also be returned to the tenant according to the mapping relationship. Based on the mapping relationship as illustrated in Table 1, a desired image file may be returned from the image server. In response to a pulling request from a common tenant, layers 1010, 1012 and 1014 may be returned, where the vulnerability related to the common security issue is fixed by the layer 1014. In response to a pulling request from a VIP tenant, layers 1010, 1012, 1014, and 1018 may be returned, where the vulnerability related to the common security issue is fixed by the layer 1014 and the vulnerability associated with the customized requirement is fixed by the layer 1018.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same invention concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present invention. The apparatus/system described in the present invention comprises several means or modules, the means or modules configured to execute corresponding steps. Upon reading this specification, those skilled in the art may understand how to write a program for implementing actions performed by these means or modules. The apparatus/system is based on the same invention concept as the method, and the same or corresponding implementation details are also applicable to means or modules corresponding to the method.

According to one embodiment of the present invention, a computing system is proposed. The computing system comprises a computer processor coupled to a computer-readable memory unit, the memory unit comprising instructions that when executed by the computer processor implements a method. In the method, a dataset is generated according to a code package, where the code package comprises an image file associated with a container for a tenant in a cloud environment, and the dataset comprises general information related to security aspects of the image file. Then, a security level of the image file is determined according to the generated dataset. A vulnerability corresponding to the code package is identified based on the security level. Next, in response to the vulnerability having been identified, the code package is updated with a patch associated with the identified vulnerability.

In one embodiment of the present invention, the image file may be loaded into a Sand Box environment to initiate the container; and package information of the container may be obtained as the dataset by launching the initiated container.

In one embodiment of the present invention, an image layer may be exported from the image file; and a configuration file of the exported image layer may be obtained as the dataset.

In one embodiment of the present invention, manifest data of the image file may be obtained as the dataset by calling a registry API.

In one embodiment of the present invention, a security indicator of the Image file may be extracted according to the dataset; and the security level of the image file may be determined by comparing the extracted security indicator of the image file with a security indicator of an authenticated image file.

In one embodiment of the present invention, at least one of a signature, a version or a root kit of the image file may be extracted according to the dataset as the security indicator of the image file.

In one embodiment of the present invention, a tenant contract associated with a tenant type supported by the code package may be obtained; and the code package may be updated with a further patch associated with a security requirement corresponding to the obtained tenant contract.

In one embodiment of the present invention, a new image layer may be created for the image file based on the patch; and a mapping relationship between the image file and the new image layer may be determined.

In one embodiment of the present invention, in response to a pulling request for the code package from a tenant, the image file may be returned to the tenant; and the new image layer may be returned according to the mapping relationship. In this embodiment, the tenant submitting the pulling request may be anyone who is interested in utilizing the image file. For example, in the above example of the social networks, the tenant may be the common member or the VIP member.

According to one embodiment of the present invention, a computer program product is proposed. The computer program product is tangibly stored on a non-transient machine-readable medium and comprising machine-executable instructions. The instructions, when executed on an electronic device, cause the electronic device to: generate a dataset according to a code package, the code package comprising an image file associated with a container for a tenant in a cloud environment, and the dataset comprises general information related to security aspects of the image file; determine a security level of the image file according to the generated abstract; identify a vulnerability corresponding to the code package based on the security level; and in response to the vulnerability having been identified, update the code package with a patch associated with the identified vulnerability.

In one embodiment of the present invention, the instructions further cause the electronic device to: load the image file into a Sand Box environment to initiate the container; and obtain package information of the container as the dataset by launching the initiated container.

In one embodiment of the present invention, the instructions further cause the electronic device to: export an image layer from the image file; and obtain a configuration file of the exported image layer as the dataset.

In one embodiment of the present invention, the instructions further cause the electronic device to: obtain manifest data of the image file as the dataset by calling a registry API.

In one embodiment of the present invention, the instructions further cause the electronic device to: extract a security indicator of the image file according to the abstract; and determine the security level of the image file by comparing the extracted security indicator of the image file with a security indicator of an authenticated image file.

In one embodiment of the present invention, the instructions further cause the electronic device to: extract least one of a signature, a version or a root kit of the image file according to the dataset as the security indicator of the image file.

In one embodiment of the present invention, the instructions further cause the electronic device to: obtain a tenant contract associated with a tenant type supported by the code package; and update the code package with a further patch associated with a security requirement corresponding to the obtained tenant contract.

In one embodiment of the present invention, the instructions further cause the electronic device to: create a new image layer for the image file based on the patch; and generate a mapping relationship between the image file and the new image layer.

In one embodiment of the present invention, the instructions further cause the electronic device to: in response to a pulling request for the code package from a tenant, return the image file to the tenant; and return the new image layer according to the mapping relationship.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable core combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of ds, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computing system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:

generating, by one or more processors of a computing system, a dataset according to a code package, the code package comprising an image file associated with a container for a tenant in a cloud environment, and the dataset comprising general information related to security aspects of the image file, said image file comprising a plurality of image layers;

extracting, by the one or more processors, a security indicator of the image file according to the dataset;

determining, by the one or more processors, a security level of the image file by comparing the extracted security indicator of the image file with a security indicator of an authenticated image file, wherein the authenticated image file was previously confirmed to be safe, wherein if said comparing demonstrates that the security indicator of the image file matches the security indicator of the authenticated image file then the image file is safe, and wherein if said comparing demonstrates that the security indicator of the image file does not match the security indicator of the authenticated image file then potential vulnerabilities may exist in the image file;

identifying, by the one or more processors, a vulnerability in the image file based on the determined security level; and in response to the vulnerability having been identified, updating, by the one or more processors, the image file with a patch that fixes the identified vulnerability, said patch comprising:
  creating a new image layer for the image file based on the patch;
  adding the new image layer to the plurality of image layers in the updated image file; and
  generating a mapping relationship between the image file and the new image layer.

2. The method of claim 1, wherein said generating the dataset according to the code package comprises:
  loading the image file into a Sand Box environment to initiate the container; and
  obtaining package information of the container as the dataset by launching the initiated container.

3. The method of claim 1, wherein said generating the dataset according to the code package comprises:
  obtaining manifest data of the image file as the dataset by calling a registry Application Programming Interface (API).

4. The method of claim 1, wherein said extracting the security indicator comprises:
  extracting a root kit of the image file according to the dataset as the security indicator of the image file.

5. The method of claim 1, said method further comprising:
  obtaining, by the one or more processors, a tenant contract associated with a tenant type supported by the code package; and
  updating, by the one or more processors, the image file with a further patch associated with a security requirement corresponding to the obtained tenant contract.

6. The method of claim 1, said method further comprising:
  in response to a pulling request for the code package from the tenant,
    returning, by the one or more processors, the image file to the tenant; and
    returning, by the one or more processors, the new image layer according to the mapping relationship.

7. A computing system, comprising one or more processors, one or more memories, and one or more computer readable hardware storage devices, said one or more hardware storage device containing program code executable by the one or more processors via the one or more memories to implement a method said method comprising:
  generating, by the one or more processors, a dataset according to a code package, the code package comprising an image file associated with a container for a tenant in a cloud environment, and the dataset comprising general information related to security aspects of the image file, said image file comprising a plurality of image layers;
  extracting, by the one or more processors, a security indicator of the image file according to the dataset;
  determining, by the one or more processors, a security level of the image file by comparing the extracted security indicator of the image file with a security indicator of an authenticated image file, wherein the authenticated image file was previously confirmed to be safe, wherein if said comparing demonstrates that the security indicator of the image file matches the security indicator of the authenticated image file then the image file is safe, and wherein if said comparing demonstrates that the security indicator of the image file does not match the security indicator of the authenticated image file then potential vulnerabilities may exist in the image file;
  identifying, by the one or more processors, a vulnerability in the image file based on the determined security level; and
  in response to the vulnerability having been identified, updating, by the one or more processors, the image file with a patch that fixes the identified vulnerability, said patch comprising:
    creating a new image layer for the image file based on the patch;
    adding the new image layer to the plurality of image layers in the updated image file; and
    generating a mapping relationship between the image file and the new image layer.

8. The computing system of claim 7, wherein said generating the dataset according to the code package comprises:
  loading the image file into a Sand Box environment to initiate the container; and
  obtaining package information of the container as the dataset by launching the initiated container.

9. The computing system of claim 7, wherein said generating the dataset according to the code package comprises:
  obtaining manifest data of the image file as the dataset by calling a registry Application Programming Interface (API).

10. The computing system of claim 7, wherein said extracting the security indicator comprises:
  extracting a root kit of the image file according to the dataset as the security indicator of the image file.

11. The computing system of claim 7, said method further comprising:
  obtaining, by the one or more processors, a tenant contract associated with a tenant type supported by the code package; and
  updating, by the one or more processors, the image file with a further patch associated with a security requirement corresponding to the obtained tenant contract.

12. The computing system of claim 7, said method further comprising:
  in response to a pulling request for the code package from the tenant,
    returning, by the one or more processors, the image file to the tenant; and
    returning, by the one or more processors, the new image layer according to the mapping relationship.

13. A computer program product, comprising one or more computer readable hardware storage devices having computer readable program code stored therein, said program code containing instructions executable by one or more processors of a computing system to implement a method, said method comprising:
  generating, by the one or more processors, a dataset according to a code package, the code package comprising an image file associated with a container for a tenant in a cloud environment, and the dataset comprising general information related to security aspects of the image file;
  determining, by the one or more processors, a security level of the image file according to the generated dataset, said image file comprising a plurality of image layers;
  extracting, by the one or more processors, a security indicator of the image file according to the dataset;
  determining, by the one or more processors, a security level of the image file by comparing the extracted security indicator of the image file with a security indicator of an authenticated image file, wherein the authenticated image file was previously confirmed to be safe, wherein if said comparing demonstrates that the security indicator of the image file matches the security indicator of the authenticated image file then the image file is safe, and wherein if said comparing demonstrates that the security indicator of the image file does not match the security indicator of the authenticated image file then potential vulnerabilities may exist in the image file;

identifying, by the one or more processors, a vulnerability in the image file based on the determined security level; and in response to the vulnerability having been identified, updating, by the one or more processors, the image file with a patch that fixes the identified vulnerability, said patch comprising:

creating a new image layer for the image file based on the patch;

adding the new image layer to the plurality of image layers in the updated image file; and generating a mapping relationship between the image file and the new image layer.

14. The computer program product of claim 13, wherein said generating the dataset according to the code package comprises:

loading the image file into a Sand Box environment to initiate the container; and obtaining package information of the container as the dataset by launching the initiated container.

15. The computer program product of claim 13, wherein said generating the dataset according to the code package comprises:

obtaining manifest data of the image file as the dataset by calling a registry Application Programming Interface (API).

16. The computer program product of claim 13, wherein said extracting the security indicator comprises:

extracting a root kit of the image file according to the dataset as the security indicator of the image file.

17. The computer program product of claim 13, said method further comprising:

obtaining, by the one or more processors, a tenant contract associated with a tenant type supported by the code package; and updating, by the one or more processors, the image file with a further patch associated with a security requirement corresponding to the obtained tenant contract.

* * * * *